(12) United States Patent
Su et al.

(10) Patent No.: US 9,374,115 B2
(45) Date of Patent: Jun. 21, 2016

(54) METHOD, BASE STATION AND APPARATUS IN A BASE STATION FOR REDUCING INTERMODULATION DISTORTION

(75) Inventors: Youping Su, Beijing (CN); Alireza Nejatian, Uppsala (SE); Fredrik Huss, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/399,222

(22) PCT Filed: May 24, 2012

(86) PCT No.: PCT/SE2012/050560
§ 371 (c)(1),
(2), (4) Date: Nov. 6, 2014

(87) PCT Pub. No.: WO2013/176590
PCT Pub. Date: Nov. 28, 2013

(65) Prior Publication Data
US 2015/0111515 A1   Apr. 23, 2015

(51) Int. Cl.
  H04B 15/00   (2006.01)
  H04B 1/10    (2006.01)
  H04B 1/525   (2015.01)

(52) U.S. Cl.
  CPC ............ H04B 1/1027 (2013.01); H04B 1/525 (2013.01)

(58) Field of Classification Search
  CPC ............ H04B 1/0475; G02F 2203/19; H03D 2200/0088
  USPC ............ 455/63.1, 67.11, 67.13, 114.2, 278.1, 455/296, 501; 375/285, 296; 330/149
  See application file for complete search history.

(56) References Cited

U.S. PATENT DOCUMENTS 7,983,327 B2 * 7/2011 Brobston .............. H03F 1/3247
                                                     375/219
8,055,235 B1   11/2011 Gupta et al.
(Continued)

FOREIGN PATENT DOCUMENTS

CA   2 658 070   9/2009

OTHER PUBLICATIONS

PCT Notification of Transmittal of the International Search Report and the Written Opinion of the International Searching Authority, or the Declaration for International application No. PCT/SE2012/050560, Mar. 21, 2013.
(Continued)

*Primary Examiner* — Sonny Trinh
(74) *Attorney, Agent, or Firm* — Baker Botts, LLP

(57) ABSTRACT

A method in a base station is provided for reducing distortion of an uplink signal received in a receiver part (20) of the base station, said distortion being caused by intermodulation, IM, products. The method comprises: generating (106), from a transmitter source signal, a modeled signal of IM components, as $n^{th}$ order IM components of the transmitter source signal, n being an integer value of 2, 3, 4 and/or 5 etc., and detecting (110) IM products of the received uplink signal, the received uplink signal comprising UL traffic components and the IM products, by correlating the received uplink signal with the IM components of the modeled signal. The method further comprises producing (112) a cancellation signal based on the detected IM products of the received uplink signal, and subtracting (114) the cancellation signal from the received uplink signal. Also, a similar apparatus in a base station is provided.

15 Claims, 4 Drawing Sheets

(56) References Cited

U.S. PATENT DOCUMENTS

| | | | |
|---|---|---|---|
| 8,170,487 B2 * | 5/2012 | Sahota | H04B 1/525 455/296 |
| 2007/0184782 A1 | 8/2007 | Sahota et al. | |
| 2009/0068974 A1 | 3/2009 | Smith | |
| 2009/0086863 A1 | 4/2009 | Komninakis et al. | |
| 2011/0075754 A1 | 3/2011 | Smith | |
| 2011/0149714 A1 | 6/2011 | Rimini et al. | |

OTHER PUBLICATIONS

Notification of the First Office Action (PCT Application in the National Phase) issued by the Patent Office of the People's Republic of China for Application No. 2012800733980 (English translation included), Oct. 26, 2015.

* cited by examiner

METHOD, BASE STATION AND APPARATUS IN A BASE STATION FOR REDUCING INTERMODULATION DISTORTION

PRIORITY

This nonprovisional application is a U.S. National Stage Filing under 35 U.S.C. §371 of International Patent Application Serial No. PCT/SE2012/050560, filed May 24, 2012, and entitled "Method, Base Station and Apparatus In A Base Station For Reducing Intermodulation Distortion."

TECHNICAL FIELD

The present disclosure relates generally to a method, a base station and an apparatus in a base station for reducing inter-modulation distortion. More specifically, it relates to a method, a base station and an apparatus in a base station for reducing distortion of an uplink signal received in a receiver part of the base station, said distortion being caused by inter-modulation, IM, products.

BACKGROUND

With today's flourishing global mobile communication development, operators are continuously aiming at reducing total cost of ownership (TCO) and identifying cost-effective methods of expanding mobile networks. This is necessary in order to cope with the rapidly growing needs of users. In order to lower the TCO, a base station may be equipped with multi carrier technology i.e. the base station may use a plurality of carriers, or carrier frequencies, within a transmitter. Such a base station may be called a multi carrier base station. This multi carrier base station can be a multi carrier in a transmitter frequency band, or multi carrier in different transmitter frequency bands. Also, the multi carriers can be for a single radio access technology (RAT) or for different RATs. A multi carrier base station needs to support high output power and a wide range of bandwidth to provide both coverage and capacity to the cell.

At the same time, a transmitter is normally non-linear, which means that the output of the transmitter is a non-linear function of the input. A non-linear multi-carrier transmitter will produce additional spectral components at its output, at frequencies differing from the transmitting frequencies. These spectral components are referred to as intermodulation products (IM products), and have a specific frequency relation to the transmitted signals. Such products may be active IM products and passive IM products. Since the IM products are spread out across the frequency spectrum, outside the transmitting frequencies, there is a risk that some of the IM products end up in the frequency spectrum of the receiver of the base station, thereby causing distortion to a signal received at the receiver. Since modern multi-carrier base stations support high transmit power and have a plurality of carriers arranged over a widespread bandwidth, the IM products may cause considerable distortion to a received signal.

The non-linearity of the power amplifier of the transmitter can be regarded as the main source of intermodulation distortion, i.e. distortion caused by IM products. There is today technology, such as digital or analog pre-distortion arrangements to take care of distortion caused by IM products originating from the power amplifier. Further IM products originating from transmitter components may be attenuated by a transmitter band pass filter arranged before the signal to be transmitted is fed to the antenna.

Although, there are also physical components arranged after the transmitter band pass filter in a base station, which components may cause IM products. Examples of these physical components include antenna(s), cables connecting the transmitter and the receiver to the antenna(s), connectors for connecting the antenna(s) and the transmitter and the receiver to the cables, and the transmitter band pass filter itself. Even though IM products caused by such physical components are much lower than the IM products caused by e.g. the power amplifier, they may cause distortion to a received signal when the IM products occur in the frequency spectrum employed by the receiver, especially if the received signal is weak. Since these IM products originate from components arranged after the transmitter band pass filter, they cannot be filtered out by the transmitter band pass filter.

SUMMARY

It is an object of the invention to address at least some of the problems and issues outlined above. More specifically, it is an object in a base station to lower distortion to a received signal caused by IM products. More specifically it is an object to lower intermodulation distortion caused by IM products originating from components of the base station arranged close to the antenna. It is possible to achieve these objects and others by using a method and an apparatus as defined in the attached independent claims.

The solution is at least partly based on the knowledge that there is a frequency relation between the generated IM products and the transmitter carrier frequencies. For example, for a transmitter having two carrier frequencies $f_1$ and $f_2$, third order IM products are generated at frequencies $2*f_1-f_2$ and $2*f_2-f_1$.

According to one aspect, a method is provided in a base station for reducing distortion of an uplink (UL) signal received in a receiver part of the base station, said distortion being caused by intermodulation, IM, products. The method comprises: generating, from a transmitter source signal, a modeled signal of IM components, as $n^{th}$ order IM components of the transmitter source signal, n being an integer value of 2, 3, 4, and/or 5 etc., and detecting IM products of the received uplink signal, the received uplink signal comprising UL traffic components and the IM products, by correlating the received uplink signal with the IM components of the modeled signal. The method further comprises producing a cancellation signal based on the detected IM products of the received uplink signal, and subtracting the cancellation signal from the received uplink signal.

By this method, it is achieved that distortions to an uplink signal received at a base station and caused by IM products originating from a transmitter source signal of the same base station are cancelled or at least reduced. This method is applicable to any distortion caused by IM products originating from the transmitter.

A transmitter source signal is a signal to be transmitted downlink including the carrier frequencies. Nth order IM components of the transmitter source signal are combinations of the carrier frequencies of the transmitter source signal occurring due to non-linearities of components of the base station affecting the transmitted signal. For example, if the base station transmits at frequency $f_1$ and $f_2$, $3^{rd}$ order IM components occur at $2*f_1-f_2$ or $2*f_2-f_1$. The term IM product has been used for the "real" IM, occurring at the receiver part but also at the transmitter part. The term IM component has been used for the modeled IM, which is modeled based on the source signal.

According to a second aspect, an apparatus in a base station is provided for reducing distortion of an uplink (UL) signal received in a receiver part of the base station, said distortion being caused by intermodulation, IM, products. The apparatus comprises: a generating unit for generating, from a transmitter source signal, a modeled signal of IM components, as $n^{th}$ order IM components of the transmitter source signal, n being an integer value of 2, 3, 4 and/or 5 etc., and an IM detection unit for detecting IM products of the received uplink signal, the received uplink signal comprising UL traffic components and the IM products, by correlating the received uplink signal with the IM components of the modeled signal. The apparatus further comprises a cancellation signal producing unit for producing a cancellation signal based on the detected IM products of the received uplink signal, and a subtraction unit for subtracting the cancellation signal from the received uplink signal.

According to a third aspect, a base station is provided, which comprises an apparatus according to the second aspect for reducing distortion of a UL signal received in a receiver part of the base station, said distortion being caused by IM products.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided in a base station to reduce distortion of a received signal caused by IM products, and specifically to lower distortion caused by IM products originating from physical components of the base station arranged close to the antenna, i.e. from a transmitter band pass filter and/or from components arranged between the transmitter band pass filter and the antenna, and/or from the antenna itself. Since IM products originating from components arranged close to the antenna cannot be filtered out by the existing transmitter band pass filter near the base station at the transmitter side, they are, according to the invention, taken care of at the receiver side.

IM products occur at frequencies that are a combination of the carrier frequencies of the transmitted signal. For example, for a transmitter using two downlink (DL) carrier frequencies $f_1$ and $f_2$, $3^{rd}$ order IM products occur at frequencies $2*f_2-f_1$ and $2*f_1-f_2$, and $5^{th}$ order IM products occur at for example frequencies $3*f_2-2*f_1$, and $3*f_1-2*f_2$.

According to an embodiment of the present invention, the knowledge of where IM products occur in the frequency spectrum based on a certain source signal is used to produce an IM model signal. The source signal is the signal originating from the transmitter, the signal that is to be transmitted downlink. Thereafter, the received uplink signal, which comprises the UL traffic signal and IM products, is correlated with the IM model signal to detect the IM products of the received uplink signal. A cancellation signal is then produced based on the detected IM products of the received signal. Thereafter, the cancellation signal is subtracted from the received uplink signal.

Consequently, by using the knowledge of where IM products would occur in a received signal based on a certain source signal to create a model signal of IM products, and correlating this model signal to the received signal to create a cancellation signal and thereafter subtracting the cancellation signal, IM products can be deleted, or at least decreased, from the received uplink signal. By such a method, also IM products originating from physical components arranged after the transmitter band pass filter can be taken care of.

Figure 1:
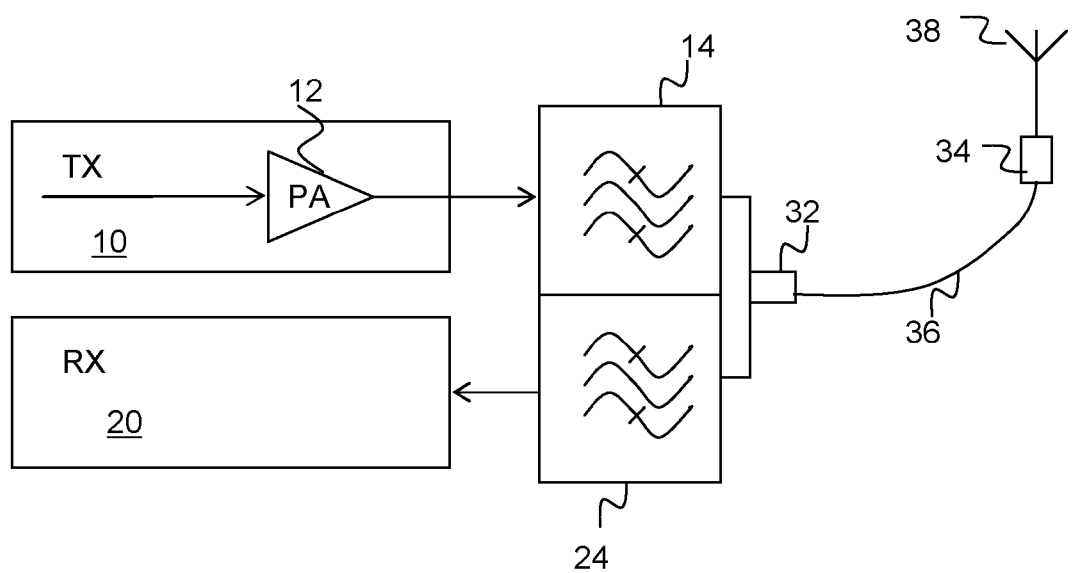
FIG. 1 is a schematic block diagram of a base station comprising a receiver part and a transceiver part and components creating IM products arranged after a TX/RX filter.

FIG. 1 illustrates schematically a base station comprising a transmitter part 10, including a power amplifier 12, a receiver part 20, a transmitter band pass filter 14 and a receiver band pass filter 24. The base station further comprises a first connector 32, a feeder cable 36, a second connector 34 and an antenna 38. The first connector 32 is arranged to connect the feeder cable 36 to the transmitter band pass filter 14 and the receiver band pass filter 24. The second connector 34 is arranged to connect the feeder cable 36 to the antenna 38. The physical components are connected such that a source signal to be transmitted is fed from the transmitter part 10 via its power amplifier 12 to the transmitter band pass filter 14, where frequencies outside the transmitter band are filtered out, and further via the first connector 32, the feeder cable 36, and the second connector 34 to the antenna 38 where the source signal is transmitted downlink over an air interface to user equipments in communication with the base station. Further, the physical components are connected such that an UL signal received at the antenna 38 is fed from the antenna 38, via the second connector 34, the feeder cable 36 and the first connector 32 to the receiver band pass filter 24, where frequencies outside the receiving frequencies are filtered out, and further to the receiver part 20.

As mentioned, components of the base station may cause IM products, which are arranged at frequencies that are a combination of the carrier frequencies of the transmitted signal. Some of these IM products may be cancelled by cancellation techniques in the transmitter part or by the transmitter band pass filter 14. Although, IM products caused by the transmitter band pass filter 14 itself, and/or the first and the second connector 32, 34, and/or the feeder cable 36 and/or the antenna 38 cannot be taken care of by the transmitter band pass filter 14 or by cancellation techniques employed in the transmitter part 10.

Figure 2:
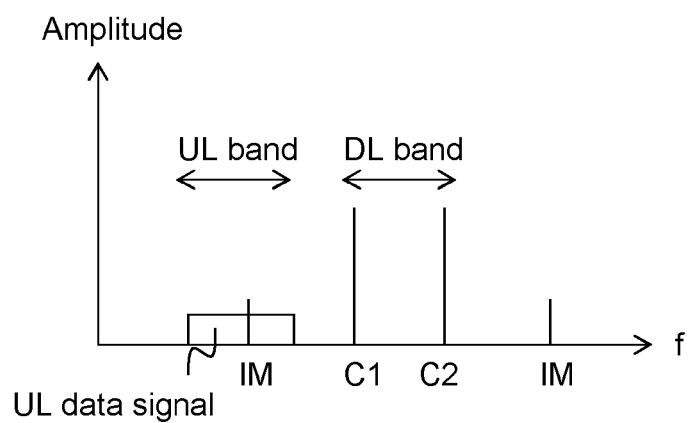
FIG. 2 is a graph illustrating signals at a multi carrier base station and on which frequencies these signals occur.

FIG. 2 shows the DL frequency band of a base station, comprising the carrier frequencies C1 and C2, and the UL frequency band of the base station. The UL traffic signals are spread out over the UL frequency band. The third order IM products are also shown in the figure, at a lower frequency side of the DL frequency band and at a higher frequency side of the DL frequency band. As could be seen in the figure, the third order IM product that is at the lower frequency side of the DL band ends up in the UL frequency band, and will therefore become a distortion to the received signal at the UL frequency band. Even though the IM product signal level may be as low as −150 dB of the transmitted signal level, the IM product signal level may be higher than the signal level of a received UL traffic signal and therefore may become a significant distortion to the received signal.

Figure 3:
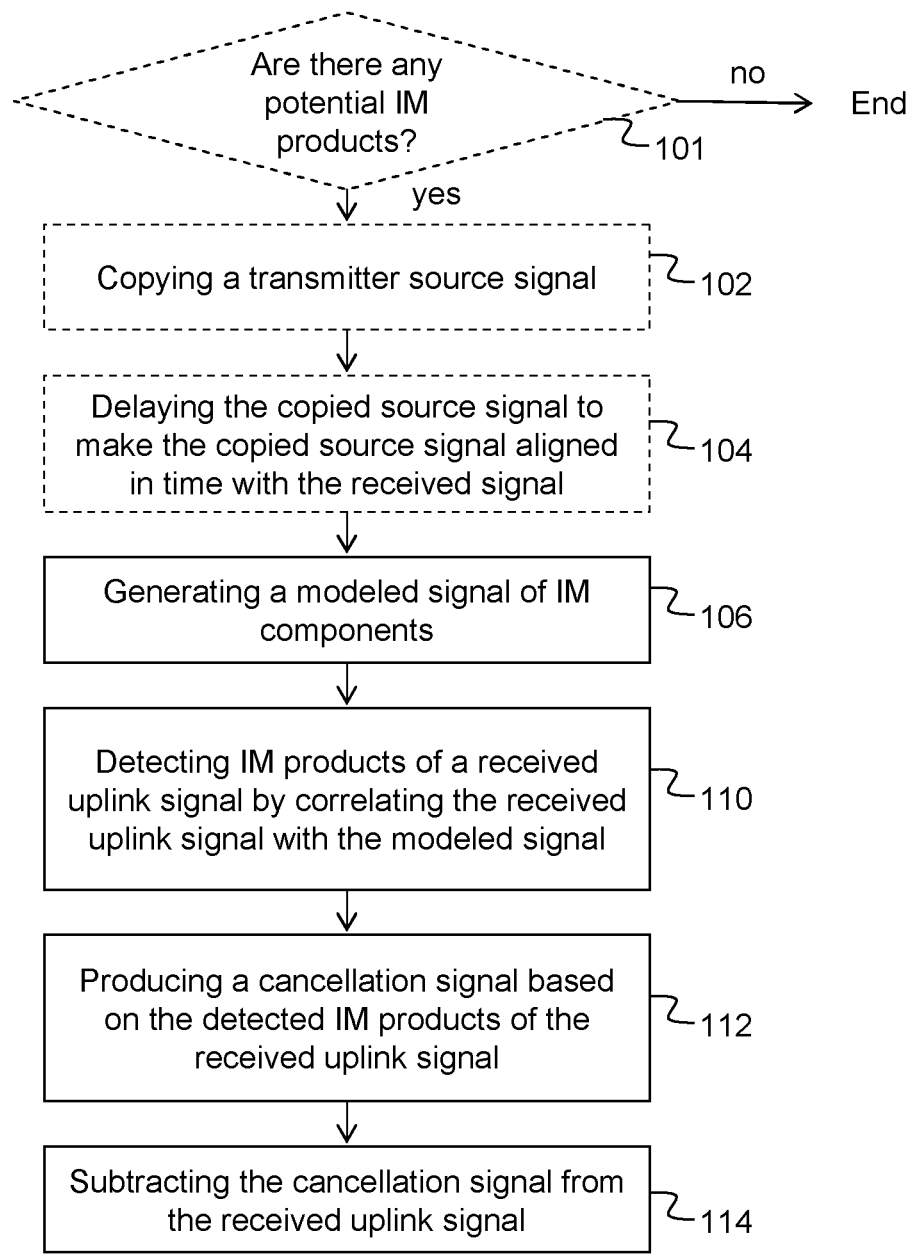
FIG. 3 is a flow chart illustrating an exemplary embodiment of a method according to the invention.

A distortion to a received UL signal caused by IM products may be cancelled or at least reduced by a method according to an embodiment of the invention as shown in FIG. 3. The method comprises: generating 106, from a transmitter source signal, a modeled signal of IM components, as $n^{th}$ order IM components of the transmitter source signal, n being an integer value of 2, 3, 4, and/or 5 etc., and detecting 110 IM products of the received uplink signal, the received uplink signal comprising UL traffic components and the IM products, by correlating the received uplink signal with the IM components of the modeled signal. The method further comprises the steps of producing 112 a cancellation signal based on the detected IM products of the received uplink signal, and subtracting 114 the cancellation signal from the received uplink signal. That n is an integer value of 2, 3, 4, and/or 5 etc. may mean that n may be any integer value from 2 and higher. Although, it is typically IM products with odd order that cause distortion to the received signal since IM products with even order often fall outside the UL frequency band. Furthermore, since the signal strength normally decreases when the value of n increases, a sufficient decrease of the IM products may be achieved by using only integer value 3 and possibly also 5. Alternatively, n may be any of the odd integer values from 3 and higher.

According to an embodiment, the method may also comprise the optional step of estimating 101 if there are any potential IM products in the UL frequency band, and only performing the method if it is estimated that there may be potential IM products in the UL frequency band. IM products may be estimated by comparing a detected level of IM products with a threshold level and only performing the method if the detected level is above the threshold. Alternatively, it may be estimated if there are IM products in the received signal by calculating where IM products may end up, based e.g. on the distance between the DL frequencies and the UL frequencies, and if they end up outside the UL frequency band, the method is not performed. In an embodiment, it is only calculated where the $3^{rd}$ order and $5^{th}$ order IM products may end up, and if they end up outside the UL frequency band, the method is not performed.

According to another embodiment, the method may comprise the optional steps of copying 102 the transmitter source signal, and delaying 104 the copied transmitter source signal to make the copied transmitter source signal aligned in time with the received uplink signal. These steps are preferably performed after the optional step of detecting 101 if there are any IM products in the UL frequency band but before the step of generating 106, from the transmitter source signal, a modeled signal of IM components. The transmitter source signal may be delayed at a coarse delay buffer. A delay default value may be used. The delay default value may be calibrated or provided by a designer such that the cancellation signal and the received IM products are at the same observation window.

According to another embodiment, to produce 112 a cancellation signal based on the detected IM products of the received uplink signal is accomplished by adjusting delay, gain and/or phase of the modeled signal such that the cancellation signal is adapted to the detected IM products of the received uplink signal. This may mean to adapt the modeled signal to the detected IM products of the received signal to produce a cancellation signal in phase with or in opposite phase to the detected IM products of the received signal.

According to yet another embodiment, the modeled IM component signal is generated 106 after digital up-conversion and crest factor reduction have been performed on the transmitter source signal.

According to another embodiment, the $n^{th}$ order IM components of the transmitter source signal are generated 106 by calculating the $n^{th}$ order product of the transmitter source signal, and frequency shifting the calculated $n^{th}$ order product from the DL frequency band to the UL frequency band. Below this is described in more detail for the generation of the $3^{rd}$ order IM components. The result after frequency shifting the nth order product could be calculated directly for the base band representation of the UL signal. This is shown in the calculations below.

Let the transmitter source signal be represented as a complex base band signal $\tilde{x}(t)$, then the signal after a digital to analog convertion, DAC, and modulation and upconversion can be written as:

$$x(t) = \Re\{\tilde{x}(t)e^{j2\pi f_{Tx}t}\} = \tfrac{1}{2}(\tilde{x}(t)e^{j2\pi f_{Tx}t} + \tilde{x}^*(t)e^{-j2\pi f_{Tx}t})$$

The $3^{rd}$ order intermodulation product y(t) can then be calculated as:

$$y(t) = x^3(t) = \tfrac{1}{8}(\tilde{x}^3(t)e^{j2\pi 3 f_{Tx}t} + 3|\tilde{x}(t)|^2(\tilde{x}(t)e^{j2\pi f_{Tx}t} + \tilde{x}^*(t)e^{-j2\pi f_{Tx}t}) + \tilde{x}^{*3}(t)e^{-j2\pi 3 f_{Tx}t})$$

Since the signal components near the transmitting frequency, Tx, are the most interesting, two of the terms on the right hand side can be dropped which gives:

$$\bar{y}(t) = \tfrac{3}{8}|\tilde{x}(t)|^2(\tilde{x}(t)e^{j2\pi f_{Tx}t} + \tilde{x}^*(t)e^{-j2\pi f_{Tx}t}) = \Re\{\tfrac{3}{4}|\tilde{x}(t)|^2 \tilde{x}(t)e^{j2\pi f_{Tx}t}\}$$

Then the resulting complex base band signal at the UL frequency band is calculated. First the expression is rearranged as:

$$\bar{y}(t) = \Re\{\tfrac{3}{4}|\tilde{x}(t)|^2 \tilde{x}(t)e^{j2\pi f_{Tx}t}\} = \Re\{\tfrac{3}{4}|\tilde{x}(t)|^2 \tilde{x}(t)e^{j2\pi(f_{Tx}-f_{Rx})t}e^{j2\pi f_{Rx}t}\}$$

The complex base band signal at the UL frequency band $\tilde{y}(t)$ is then identified as:

$$\tilde{y}(t) = \tfrac{3}{4}|\tilde{x}(t)|^2 \tilde{x}(t)e^{j2\pi(f_{Tx}-f_{Rx})t}$$

The complex base band signal $\tilde{y}(t)$ is then interpreted as the $3^{rd}$ order IM component of the transmitter source signal.

Similar calculations can be done for the other nth order intermodulation products, e.g. the $5^{th}$ order intermodulation product.

According to an embodiment, only the $n^{th}$ order intermodulation products that end up in the UL frequency band may be calculated. Further, only IM products that are above a certain threshold may be used. Normally, the $3^{rd}$ order IM products have the highest signal levels. The signal levels may then be lower the higher the order of the IM product.

Figure 4:
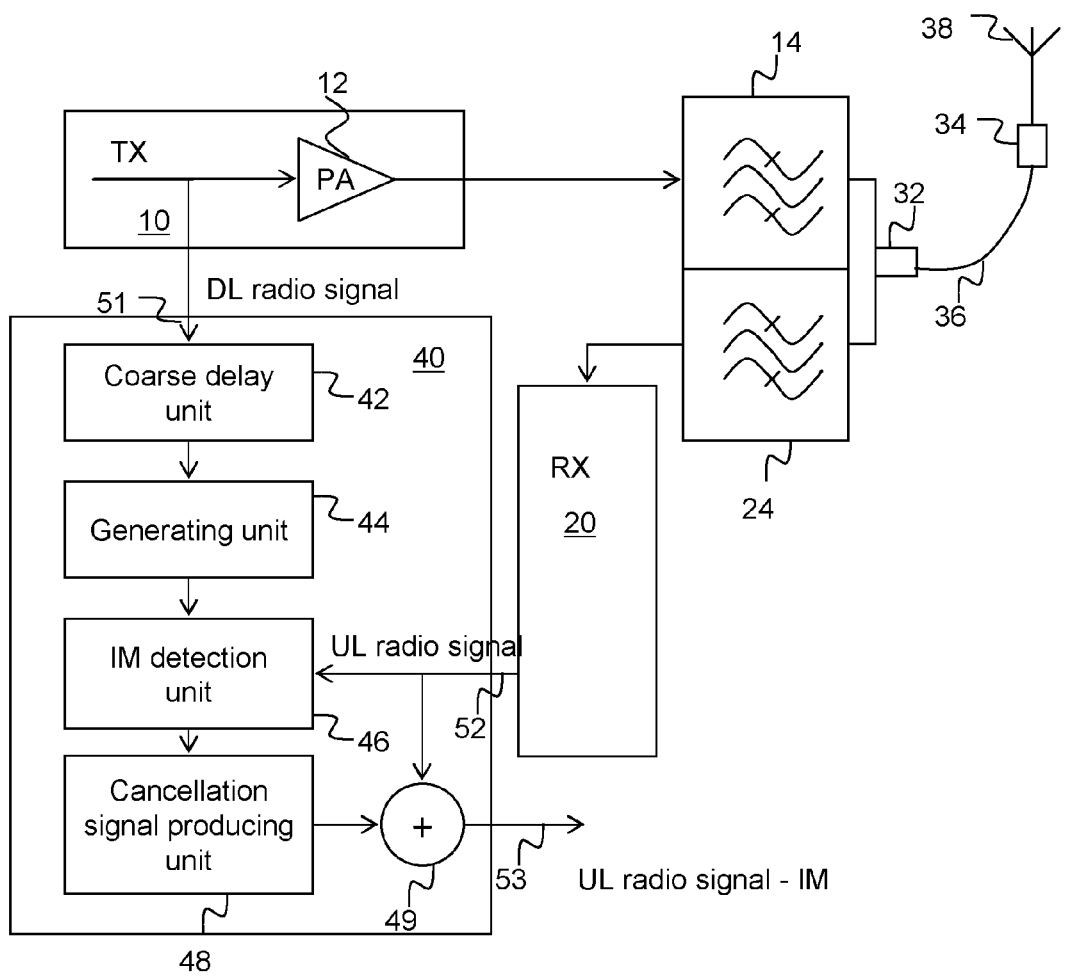
FIG. 4 is a schematic block diagram of a base station comprising an apparatus according to an embodiment of the invention.

FIG. 4 illustrates a base station similar to the base station of FIG. 2, equipped with an apparatus 40 for reducing distortion of an uplink signal received in a receiver part 20 of the base station, said distortion being caused by IM products. The apparatus has a first input 51 for receiving a transmitter source signal, e.g. a DL radio signal, from the transmitter part 10. Further, the apparatus 40 has a second input 52 for receiving a UL signal, i.e. an uplink radio signal, from the receiver part 20.

According to an embodiment, the apparatus comprises: a generating unit 44 for generating, from a transmitter source signal, a modeled signal of IM components, as $n^{th}$ order IM components of the transmitter source signal, n being an integer value of 2, 3, 4 and/or 5 etc. and an IM detection unit 46 for detecting IM products of the received uplink signal, the received uplink signal comprising UL traffic components and the IM products, by correlating the received uplink signal with the IM components of the modeled signal. The apparatus further comprises a cancellation signal producing unit 48 for producing a cancellation signal based on the detected IM products of the received uplink signal, and a subtraction unit 49 for subtracting the cancellation signal from the received uplink signal. The subtraction unit 49 may of course be an addition unit, which adds an inverse cancellation signal, instead of a subtraction unit subtracting a cancellation signal.

According to an embodiment, the generating unit 44 is arranged to generate only $3^{rd}$ order and $5^{th}$ order IM components of the transmitter source signal.

According to another embodiment, the generating unit 44 is arranged to generate the $n^{th}$ order IM components by calculating an $n^{th}$ order product of the transmitter source signal, and frequency shifting the calculated $n^{th}$ order product from the DL frequency band to the UL base band.

According to yet another embodiment, the generating unit 44 is arranged to generate the modeled IM component signal after digital up-conversion and crest factor reduction have been performed on the transmitter source signal.

According to another embodiment, the cancellation signal producing unit 48 is arranged to produce a cancellation signal based on the detected IM products of the received uplink signal by adjusting delay, gain and/or phase of the modeled signal such that the cancellation signal is adapted to the detected IM products of the received uplink signal.

According to still another embodiment, the apparatus 40 is arranged for copying the transmitter source signal. The apparatus further has a coarse delay unit 42 for delaying the copied transmitter source signal to make the copied transmitter source signal aligned in time with the received uplink signal.

According to yet another embodiment, the apparatus 40 is arranged for estimating if there are IM products in the UL frequency band, and only performing the method if it is estimated that there are IM products in the UL frequency band.

According to an embodiment, a transmitter source signal may be fed from the transmitter part 10 to the first input 51 of the apparatus 40 for reducing distortion caused by IM products. The transmitter source signal is then received at the coarse delay unit 42 that delays the transmitter source signal such that it is adapted to a similar time window as the UL radio signal received by the receiving part 20. The delayed transmitter source signal is then fed to the generating unit 44 that generates a model signal based on the transmitter source signal. The model signal comprises $3^{rd}$, and/or $5^{th}$ etc. IM components of the transmitter source signal. The IM components are calculated as a combination of the carrier frequencies of the transmitter source signal. For example, for a transmitter having two carrier frequencies $f_1$ and $f_2$, the $3^{rd}$ order IM components would be arranged at frequencies $2*f_2-f_1$ and $2*f_1-f_2$, and $5^{th}$ order IM components would be arranged at frequencies $3*f_2-2*f_1$, $3*f_1-2*f_2$, $4*f_1-f_2$, $4*f_2-f_1$ The generated model signal comprising the calculated IM components is then fed to the IM detection unit 46. Also, a UL radio signal received at the antenna 38 and fed to the receiver part 20 is fed to the IM detection unit 46 via the second input 52. The UL radio signal fed to the IM detection unit 46 comprises the UL traffic signal and IM products. In the IM detection unit 46, the model signal comprising the generated IM components is correlated with the UL radio signal to find the IM products of the UL radio signal. A signal comprising the found IM products are then fed to the cancellation signal producing unit 48 to produce a cancellation signal that would comprise the found IM products. The cancellation signal may be produced in phase with the found IM products. The cancellation signal is then fed to the subtraction unit 49. To the subtraction unit 49 is also fed a copy of the UL radio signal that was received at the first input 52. In the subtraction 49, the cancellation signal is subtracted from the UL radio signal to produce a UL radio signal with no or at least reduced IM products at the output 53 of the apparatus 40. Alternatively, the cancellation signal is 180 degrees out of phase compared to the found IM products. The subtraction unit may then be an addition unit (as shown in 49 of FIG. 4).

Figure 5:
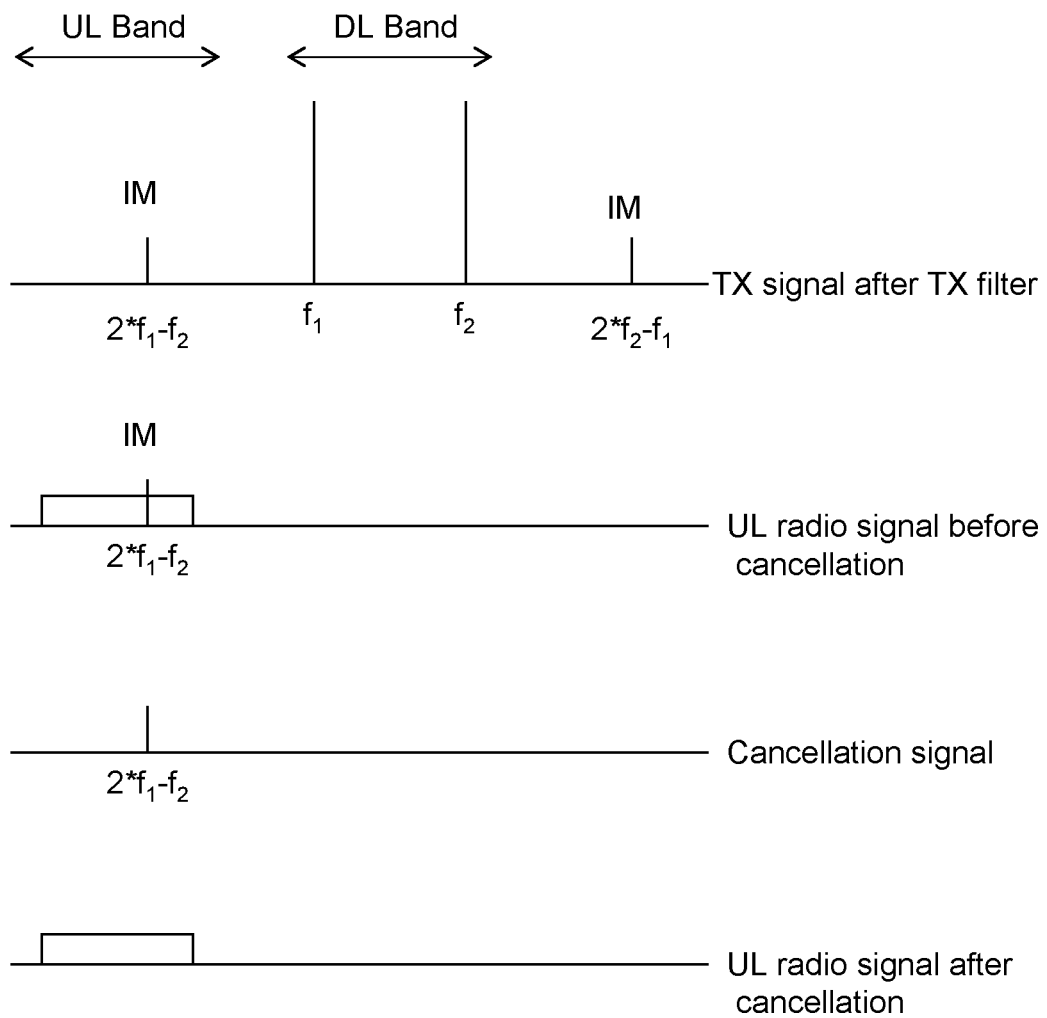
FIG. 5 is a graph showing $3^{rd}$ order intermodulation products of a received signal before and after cancellation according to embodiments of the present invention.

FIG. 5 is a graph illustrating the different signals of the base station when using an apparatus and a method according to embodiments of this invention. In the upper graph a transmitter radio signal is shown after having passed the transmitter band pass filter. As shown, the transmitter radio signal comprises two carrier frequencies $f_1$, $f_2$. The two carrier frequencies give rise to $3^{rd}$ order IM products at $2*f_2-f_1$ and at $2*f_1-f_2$. IM products that occur due to the physical components arranged after the transmitter signal has passed the transmitter band pass filter cannot be filtered out.

In the second graph a UL signal received at the receiving part of the base station is shown. The received UL signal comprises the transmitted UL traffic signal and the IM products originating from the transmitted signal within the UL band. The IM product at frequency $2*f_1-f_2$ ends up in the UL band and therefore gives rise to distortion to the UL traffic signal.

The third graph shows a cancellation signal that may have been produced by the method and apparatus of the invention. The cancellation signal is at the same frequency as the IM product at frequency $2*f_1-f_2$ and has approximately the same amplitude. The fourth graph shows the UL radio signal after the cancellation signal has been applied. As seen in the fourth graph, the IM product of the UL radio signal at frequency $2*f_1-f_2$ has been cancelled out.

In FIG. 5 for simplicity, only $3^{rd}$ order IM products are shown. Although, also $5^{th}$ order products etc. may be cancelled. Also, the $3^{rd}$ order IM product at $2*f_2-f_1$ may be cancelled in a similar way.

The methods and apparatuses described may cancel both passive and active IM products occurring before and after a transmitter band pass filter 14.

The method of the invention may be realized by a computer program product arranged in the base station.

While the solution has been described with reference to specific exemplary embodiments, the description is generally only intended to illustrate the inventive concept and should not be taken as limiting the scope of the solution. The solution is defined by the appended claims.

The invention claimed is:

1. A method performed by a base station for reducing distortion of an uplink signal received in a receiver part of the base station, said distortion being caused by intermodulation (IM) products, the method comprising:
   generating, from a transmitter source signal, a modeled signal of IM components, as nth order IM components of the transmitter source signal, n being an integer value of 2, 3, 4 and/or 5 etc.;
   detecting IM products of the received uplink signal, the received uplink signal comprising uplink (UL) traffic components and the IM products, by correlating the received uplink signal with the IM components of the modeled signal;
   producing a cancellation signal based on the detected IM products of the received uplink signal, and
   subtracting the cancellation signal from the received uplink signal.

2. The method according to claim 1, wherein generating a modeled signal of IM components comprises generating only $3^{rd}$ order and $5^{th}$ order IM components of the transmitter source signal.

3. The method according to claim 1, wherein the $n^{th}$ order IM components are generated by calculating an $n^{th}$ order product of the transmitter source signal, and frequency shifting the calculated $n^{th}$ order product from the downlink (DL) frequency band to the UL frequency band.

4. The method according to claim 1, wherein the modeled IM component signal is generated after digital up-conversion and crest factor reduction have been performed on the transmitter source signal.

5. The method according to claim 1, wherein producing a cancellation signal based on the detected IM products of the received uplink signal is accomplished by adjusting delay, gain and/or phase of the modeled signal such that the cancellation signal is adapted to the detected IM products of the received uplink signal.

6. The method according to claim 1, further comprising:
copying the transmitter source signal; and
delaying the copied transmitter source signal to make the copied transmitter source signal aligned in time with the received uplink signal.

7. The method according to claim 1, further comprising:
estimating if there are IM products in the UL frequency band, and only performing the method if it is estimated that there are IM products in the UL frequency band.

8. An apparatus in a base station for reducing distortion of an uplink signal received in a receiver part of the base station, said distortion being caused by intermodulation (IM) products, the apparatus comprising:
a generating unit for generating, from a transmitter source signal, a modeled signal of IM components, as $n^{th}$ order IM components of the transmitter source signal, n being an integer value of 2, 3, 4, and/or 5 etc.;
an IM detection unit for detecting IM products of the received uplink signal, the received uplink signal comprising uplink (UL) traffic components and the IM products, by correlating the received uplink signal with the IM components of the modeled signal;
a cancellation signal producing unit for producing a cancellation signal based on the detected IM products of the received uplink signal, and
a subtraction unit for subtracting the cancellation signal from the received uplink signal.

9. The apparatus according to claim 8, wherein the generating unit is arranged to generate only $3^{rd}$ order and $5^{th}$ order IM components of the transmitter source signal.

10. The apparatus according to claim 8, wherein the generating unit is arranged to generate the $n^{th}$ order IM components by calculating an $n^{th}$ order product of the transmitter source signal, and frequency shifting the calculated nth order product from the downlink (DL) frequency band to the UL frequency band.

11. The apparatus according to claim 8, wherein the generating unit is arranged to generate the modeled IM component signal after digital up-conversion and crest factor reduction have been performed on the transmitter source signal.

12. The apparatus according to claim 8, wherein the cancellation signal producing unit is arranged to produce a cancellation signal based on the detected IM products of the received uplink signal by adjusting delay, gain and/or phase of the modeled signal such that the cancellation signal is adapted to the detected IM products of the received uplink signal.

13. The apparatus according to claim 8, wherein the apparatus is arranged for copying the transmitter source signal; and
wherein the apparatus further has a coarse delay unit for delaying the copied transmitter source signal to make the copied transmitter source signal aligned in time with the received uplink signal.

14. The apparatus according to claim 8, wherein the apparatus is arranged for estimating if there are IM products in the UL frequency band, and only performing the method if it is estimated that there are IM products in the UL frequency band.

15. A base station comprising the apparatus according to claim 8.

* * * * *